US008963541B2

(12) United States Patent
Frachon et al.

(10) Patent No.: US 8,963,541 B2
(45) Date of Patent: Feb. 24, 2015

(54) POSITION SENSOR USING A MOVEABLE FERROMAGNETIC ELEMENT

(75) Inventors: Didier Frachon, Besancon (FR); Stephane Biwersi, Frambouhans (FR)

(73) Assignee: Moving Magnet Technologies (MMT), Besancon (FR)

(*) Notice: Subject to any disclaimer, the term of this patent is extended or adjusted under 35 U.S.C. 154(b) by 273 days.

(21) Appl. No.: 13/640,893

(22) PCT Filed: Apr. 7, 2011

(86) PCT No.: PCT/FR2011/050783
§ 371 (c)(1),
(2), (4) Date: Nov. 20, 2012

(87) PCT Pub. No.: WO2011/128558
PCT Pub. Date: Oct. 20, 2011

(65) Prior Publication Data
US 2013/0057258 A1    Mar. 7, 2013

(30) Foreign Application Priority Data
Apr. 14, 2010   (FR) ...................................... 10 52858

(51) Int. Cl.
*G01B 7/14* (2006.01)
*G01B 7/30* (2006.01)
*G01D 5/14* (2006.01)

(52) U.S. Cl.
CPC ...................................... *G01D 5/147* (2013.01)
USPC ............... 324/207.2; 324/207.24; 324/207.25

(58) Field of Classification Search
None
See application file for complete search history.

(56) References Cited

U.S. PATENT DOCUMENTS

| 4,112,408 | A | 9/1978 | Roozenbeek |
| 5,600,238 | A | 2/1997 | Holloway et al. |
| 6,043,645 | A * | 3/2000 | Oudet et al. ............... 324/207.2 |
| 6,518,749 | B1 * | 2/2003 | Oudet et al. ............... 324/207.2 |
| 6,593,734 | B1 | 7/2003 | Gandel et al. |
| 7,028,545 | B2 | 4/2006 | Gandel et al. |
| 7,391,205 | B2 | 6/2008 | Gandel et al. |
| 2006/0123903 | A1 | 6/2006 | Gandel et al. |
| 2006/0125473 | A1 | 6/2006 | Frachon et al. |
| 2011/0043194 | A1 | 2/2011 | Frachon et al. |
| 2011/0175600 | A1 | 7/2011 | Jerance et al. |

FOREIGN PATENT DOCUMENTS

FR   2 845 469   4/2004
GB   1 143 508   2/1969

OTHER PUBLICATIONS

International Search Report Issued Oct. 17, 2011 in PCT/FR11/050783 Filed Apr. 7, 2011.

* cited by examiner

*Primary Examiner* — Minh N Tang
(74) *Attorney, Agent, or Firm* — Oblon, Spivak, McClelland, Maier & Neustadt, L.L.P.

(57) ABSTRACT

The invention relates to a contactless magnetic sensor for detecting a linear or angular position, comprising a moveable ferromagnetic element (1) the position of which is detected, and a stator assembly (2) itself, comprising two ferromagnetic parts (3, 4), defining with the moveable ferromagnetic element (1) two respective air gaps (7, 8), a permanent magnet (5) and a magneto-sensitive element (6) subjected to a magnetic field that depends on the position of the moveable ferromagnetic element (1) and designed to deliver a measurement signal that depends on the magnetic field to which it is subjected. According to the invention, the two ferromagnetic parts (3, 4) define therebetween a third air gap (9), the permanent magnet (5) being rigidly connected only to the first ferromagnetic part (3) and the magneto-sensitive element (6) being placed in the third air gap (9).

9 Claims, 10 Drawing Sheets

POSITION SENSOR USING A MOVEABLE FERROMAGNETIC ELEMENT

The present invention relates to the field of magnetic position sensors, and more particularly absolute position sensors for detecting a linear position or magnetic rotating sensors using a moveable assembly, mainly composed of a ferromagnetic element, the position of which is detected.

More precisely, the present invention relates to a contactless magnetic sensor for detecting a linear or angular position, comprising at least a stator assembly and a ferromagnetic element moveable relative to the stator assembly and the position of which is detected, with the stator assembly itself comprising at least a first and a second ferromagnetic part, at least a first permanent magnet and at least one magneto-sensitive element subjected to a magnetic field that depends on the position of the moveable ferromagnetic element and designed to deliver a measurement signal that depends on the magnetic field to which it is subjected, with the first permanent magnet being rigidly connected to the first ferromagnetic part, and the ferromagnetic parts defining with the moveable ferromagnetic element at least respective first and second air gaps.

A sensor of this type is described in the U.S. Pat. No. 4,112,408.

However, the sensor disclosed in this patent belongs to the class of digital encoders, and thus makes it possible only to detect the presence or the absence, in an air gap, of a moveable ferromagnetic element, or of a part of the element.

Besides, sensors of a close type, the two ferromagnetic parts of the stator assembly of which are coupled by the permanent magnet, and thus operationally form only one part, are known from the patents GB 1 143 508 and U.S. Pat. No. 5,600,238.

Although the sensor mentioned in the patent GB 1 143 508 belongs to the class of digital encoders too, the sensor of the U.S. Pat. No. 5,600,238 makes it possible, on the other hand, to detect in a continuously variable way, the position of a moveable ferromagnetic element relative to such stator assembly.

However, the strict geometrical constraints imposed by the structure of the sensor disclosed in the U.S. Pat. No. 5,600,238 make it inappropriate for use in the applications which allow only small global dimensions.

Another sensor making it possible to detect, in a continuously variable way, the position of the moveable ferromagnetic element relative to the stator assembly is disclosed for example in the Applicant's patent FR 2 845 469.

According to the teachings of this preceding document, the moveable ferromagnetic element moves relative to the permanent magnet, and the magnet includes a cavity wherein the magneto-sensitive probe is built. The magneto-sensitive probe is thus subjected to a magnetic field, the amplitude of which depends on the position of the moveable ferromagnetic element. Such ferromagnetic element is itself so profiled as to generate a linear variation of the amplitude of the magnetic field which the probe is sensitive to (FIG. 1).

In spite of the advantages it nevertheless offers, such known structure has the following limits:
high sensitivity to mechanical tolerances;
significant signal offset relative to the null induction point (Gauss 0) which makes its temperature compensation difficult; and
necessity of having a significant form factor to have a sufficient signal variation.

Known sensors thus do not make it possible to easily meet the need for small-sized systems or high precision in spite of large production or operation tolerances (mechanical tolerance, temperature, . . . . ).

In this context, the present invention aims at providing a sensor free of at least one of the above limits.

For this purpose, the sensor of the invention, which, on the other hand, is compliant with the generic definition given in the preamble above, is mainly characterized in that the first permanent magnet is only rigidly connected to the first ferromagnetic part, in that the two ferromagnetic parts define therebetween at least a third air gap, and in that the magneto-sensitive element is placed in such third air gap.

The invention thus further meets the need, for reasons of design, simplicity or strength, for a contactless position, the moveable ferromagnetic element of which has no added part, and more particularly no permanent magnet.

The magneto-sensitive element preferably comprises a Hall-effect probe sensitive to the amplitude of at least one of the components of the magnetic field in the third air gap, and can, for instance, be composed of a programmable linear probe of the MLX90251 or HAL825 types.

The solution provided by the present application makes it possible, more particularly when applied to an axisymetric structure, to significantly reduce sensitivity to geometrical tolerances. It should be noted that, in the whole document, the word "axisymetric" will apply to any component at least substantially rotationally symmetrical about an axis collinear with the direction of movement of the moveable ferromagnetic element.

Besides, in optimized embodiments, the present solution makes it possible to obtain field variations compatible with the magneto-sensitive elements used. More particularly, using the invention for measuring very small movements (typically a few tenths of a millimeter) may be considered.

The variations measured of the magnetic field will preferably, but not limitatively be close to the Gauss 0, which is a stable value in temperature, thus making the sensor much less sensitive to the variations in temperature than the structure of the prior art, and more easily programmed.

According to a first embodiment, the invention relates to a magnetic sensor for detecting a linear position of a moveable ferromagnetic element using, in addition to the moveable ferromagnetic element, the position of which is detected, a stator assembly comprising at least:
a first substantially axisymetric ferromagnetic part,
a permanent magnet having a substantially cylindrical shape rigidly connected to the first ferromagnetic part, it being possible to magnetize such magnet axially or radially,
a second substantially axisymetric ferromagnetic part and a magneto-sensitive element,
with the first and the second stator ferromagnetic parts defining with the moveable ferromagnetic element respectively first and second air gaps, and defining therebetween a third air gap, wherein the magneto-sensitive element is placed.

A judicious dimensioning of the stator assembly will make it possible to obtain a linear variation of the magnetic field as a function of the movement of the moveable ferromagnetic element.

One of the advantages residing in the utilisation of a revolution structure of this type is that, in any point of the course of travel, and as due to the effect of integration of the magnetic field, the global permeance as seen by the various air gaps—and consequently the field measured by the magneto-sensitive element—shall be very little sensitive to the radial clearances or the various rotations of the moveable element.

According to a preferred embodiment, the second stator ferromagnetic part shall include, on the outer diameter thereof, an enlargement constituting a flux concentration area making it possible to increase the variation o the magnetic field. Such enlargement may ideally be limited to a restrained angular arc opposite the magneto-sensitive probe, so as to improve the concentration effect, still.

Besides, such structure has the advantage of being able to measure the movement of an axis having a length that does not depend on the course of travel, without any variation in the diameter. Generally, at the beginning of the course of travel, the end of the axis composing the moveable ferromagnetic element will be positioned opposite the second ferromagnetic part.

On the contrary, as this structure is not symmetric, the variation in the measured signal may be offset, which means that the variation in the magnetic field along the course of travel will not be around the Gauss 0. If such offset is too large, the programming of the magneto-sensitive element probe may be complicated and the sensitivity of the sensor to temperature increased.

This may be compensated by extending the permanent magnet or, according to an alternative solution (a third alternative solution shown in FIG. 9), by integrating in the axial air gap a secondary disk-shaped polarization magnet axially magnetized. Ideally, the magnet can extend on less than 360°, so as to enable an optimal integration of the probe and to reduce the outer diameter of the sensor.

According to another alternative solution (a second alternative solution shown in FIG. 8), a third ferromagnetic part can be added, either under the main magnet, if the magnetization is axial, or on the inner diameter of the main permanent magnet if the magnetization is radial. Ideally, the third ferromagnetic part shall have a substantially cone-shaped axial enlargement, so as to improve the linearity of the sensor.

In all the embodiments provided, it may be considered for the magnets to have a substantially conical section, in order to improve the linearity of the signal.

According to a second embodiment, the invention relates to a sensor for detecting a linear position using, in addition to the moveable ferromagnetic element, the position of which is detected, a stator assembly including at least:
- a first substantially axisymetric ferromagnetic part having a "C"-shaped longitudinal section.
- two permanent magnets having a cylindrical or disc shape, rigidly connected to the lower and the upper branch of the "C", respectively, which can be either radially magnetized and positioned on the inner diameter of the branches of the "C", or axially magnetized and positioned under the upper branch and on the lower branch of the "C", respectively.
- a second ferromagnetic part of revolution about the axis defined by the direction of movement placed between the two branches of the "C", and
- a magneto-sensitive element, with each branch of the "C" of the first stator ferromagnetic part defining with the moveable ferromagnetic element a radial or axial air gap, with the second stator ferromagnetic part defining with the moveable ferromagnetic element a radial air gap, and the two stator ferromagnetic parts defining therebetween a radial air gap wherein the magneto-sensitive element is positioned.

Preferably, the magnets shall be magnetized "serially", i.e. for instance, in the axial case, with the North oriented upwards for both magnets, or in the radial case, with the North oriented inwards for one magnet and oriented outwards for the other one, so that the fluxes produced by each one of the magnets move in the same direction as that of the magnetic field formed.

According to this embodiment, if the moveable part is in a symmetric position relative to the plane perpendicular to the movement passing through the middle of the "C", perpendicular to the direction of the movement, the magnetic field generated by the permanent magnet(s) will, for instance, travel on the outer section of the "C" from the upper branch toward the lower branch, then pass through a first air gap between the "C" and the moveable ferromagnetic element, be guided by this element, and close the loop to the upper branch of the "C" by passing through a second air gap between the "C" and the moveable ferromagnetic element. Thus no magnetic flux will pass through the air gaps relating to the second stator ferromagnetic part, and the radial component measured by the magneto-sensitive probe will be null (Gauss 0 position).

On the contrary, if the moveable element is placed at a distance from this middle position, unbalance will be created and a magnetic flux will pass through the third and the fourth air gaps. Thus, if the moveable element moves between two symmetric positions (−Y) and (+Y) relative to the median plane, a variation of the symmetrical field between [−B(Y)] and (BY) will be measured. Such bipolar variation of the signal will thus make it possible to have a middle point (Gauss 0), which is not sensitive to temperature, and generally, a sensor relatively stable in temperature and an easier programming of the linear magneto-sensitive probe.

A judicious dimensioning of the moveable element and the stator unit will make it possible to obtain a linear variation of the magnetic field according to the movement.

One of the advantages in using a structure of revolution of this type is that, in any point of the course of travel and due to the effect of integration of the magnetic flux, the global permeance as seen by the magnetic circuit formed—and consequently the field measured by the magneto-sensitive element—shall be very little sensitive to the radial clearances and to the various rotations of the moveable element.

Preferably, the second ferromagnetic part will include, on the outer diameter thereof, an enlargement composing a flux concentration area making it possible to increase the variation of the magnetic field. Such an enlargement may ideally be limited to a restrained angular arc opposite the magneto-sensitive probe, so as to improve the concentration effect, still.

A structure as the one executed according to the embodiments disclosed here-above shall then be more particularly adapted to the configurations wherein the moveable ferromagnetic element may symmetrically move opposite the ends of the stator assembly, at a height close to that of the stator assembly.

However, in some applications, the moveable ferromagnetic element may be particularly long, because of the mechanical configuration (the moveable ferromagnetic element is totally composed of the moveable ferromagnetic part), which makes it impossible to obtain the conditions described above. It may then be judicious to reduce the diameter of the moveable part out of the areas useful for the operation of the sensor, so as to reduce the leakage fluxes which will tend to generate an offset and reduce the useful variation of the magnetic field.

Generally speaking, the moveable ferromagnetic element may be associated to any other element to be moved, having a non ferromagnetic nature (plastic, aluminium, . . . ) and any length, without affecting the measured magnetic field.

It should also be noted that only one permanent magnet could also be used without challenging the general principle of this structure. The general symmetry would then no longer be ensured, which could in particular induce an offset in the measured signal magnetic flux, but which can be acceptable in some cases.

A structure according to the second embodiment and more particularly in the case of axially magnetized magnets, can be favourably applied to an encapsulated sensor detecting very small movements (typically a few tenths of a millimeter). When combined with rigid elements also used as a suspension, the structure according to the second embodiment will advantageously be applied to the pressure or vibration measurements.

For reasons of compactness, or if the mechanical configuration enables reduced mechanical clearances, the structures according to the embodiments disclosed so far can be restrained to a limited angular sector.

According to a third embodiment, the invention relates to a rotating position sensor comprising, in addition to the moveable ferromagnetic element, the position of which is detected, a stator assembly including:
   a first ferromagnetic part deployed on a limited angular sector and having a "C" shape,
      two permanent magnets, as radially magnetized tiles rigidly connected to each branch of the "C",
      a second ferromagnetic part positioned between the moveable element and the outer part of the "C", and
      a magneto-sensitive element,
with each branch of the "C" of the first stator ferromagnetic part defining with the moveable ferromagnetic element a radial air gap, with the second ferromagnetic part defining with the moveable ferromagnetic element a radial air gap, and the two stator ferromagnetic parts defining therebetween a radial air gap wherein the magneto-sensitive element is positioned.

Preferably, the magnets are magnetized "serially", i.e. for instance, with the North oriented inwards for one magnet and the North oriented outwards, for the other magnet, so that the fluxes produced by each one of the magnets flow in the same direction in the magnetic circuit formed.

The operation of the structure will, in addition, be identical with the second embodiment.

Preferably, the additional part will include, on the outer diameter thereof, an enlargement constituting a flux concentration area, making it possible to increase the variation in the magnetic field, with such enlargement being ideally limited to a restrained angular arc opposite the magneto-sensitive probe, so as to improve the concentration effect, still.

Generally, structures according to the second and third embodiments disclosed above will have a very good immunity against outer fields, because of the "closed" structure, with the magneto-sensitive probe being protected by the stator magnetic circuit.

In addition, the various embodiments disclosed here are not at all exclusive or limiting the possible execution of the invention provided here.

Other characteristics and advantages of the invention will appear more clearly when reading the following detailed exemplary embodiments, while referring to the appended drawings which respectively show:

FIG. 1, a structure of a sensor for detecting a linear position according to the prior art;

FIG. 2, a sectional view of a sensor for detecting a linear position according to the first embodiment;

FIG. 3 is a three-quarter view of the position sensor according to the first embodiment;

FIGS. 4a and 4b, a view of the sensor field lines according to the first embodiment for two end positions of the moveable element;

FIG. 5, a diagram showing the variation of the magnetic field measured by the magneto-sensitive element and the associated linearity, according to the movement of the moveable element for a sensor according to the first embodiment;

FIG. 6, a diagram showing the variation of the magnetic field measured by the magneto-sensitive element and the associated linearity, according to a radial clearance, for a sensor according to the first embodiment;

FIG. 7, a sectional view of a sensor according to a first alternative solution of the first embodiment;

FIG. 8, a three-quarter view of a sensor according to a second alternative solution of the first embodiment;

FIG. 9, a sectional view of a sensor according to a third alternative solution of the first embodiment;

FIG. 10, a sectional view of a sensor according to a fourth alternative solution of the first embodiment;

FIG. 11, a sectional view of a sensor according to a fifth alternative solution of the first embodiment;

FIG. 12, a sectional view of a sensor for detecting a linear position according to the second embodiment;

FIGS. 13a and 13b, a view of the sensor field lines according to the second embodiment, in the middle and end positions;

FIG. 14, a diagram showing the variation of the magnetic field measured by the magneto-sensitive element and the associated linearity, according to the movement of the moveable element for the sensor according to the second embodiment;

FIG. 15, a sectional view of a sensor according to a first alternative solution of the second embodiment;

FIG. 16, a sectional view of a sensor for detecting an angular position according to a second alternative solution of a second embodiment;

FIG. 17, a sectional view of a sensor according to the third embodiment.

FIG. 1 shows a configuration according to the prior art above (FR 2 845 469), composed of a moveable ferromagnetic element 1 the linear position of which is required.

FIG. 2 and FIG. 3 respectively represent a sectional view and a three-quarter view of a linear position sensor according to the first embodiment of the invention. The sensor more particularly includes an axially magnetized permanent magnet 5, with a first ferromagnetic part 3 being positioned on the magnet 5. The magnet 5 represented here has a cylindrical shape, but for reasons of optimization, the inner shape can be slightly conical. A second ferromagnetic part 4 axially offset relative to the first ferromagnetic part 3 creates, with the upper face of the part 3, an air gap 9 wherein a magneto-sensitive element 6 is inserted. The second ferromagnetic part 4 includes an enlargement 10 which enables a concentration of the magnetic flux opposite the magneto-sensitive element 6. Inside the stator assembly 2 composed of the parts 3 and 4, of the magnet 5, and of the magneto-sensitive element 6, a ferromagnetic element 1 moves linearly, taking the shape of an axis and defining two air gaps 7 and 8 with the stator assembly 2.

In this embodiment, like all the other embodiments, the ferromagnetic parts 3 and 4 are independent and spaced from each other. As a consequence, when the magnet 5 is rigidly connected to the first ferromagnetic part 3, it is distant from the second ferromagnetic part 4.

FIGS. 4a and 4b represent magnetic field lines in the sensor of FIG. 3 respectively for the position at the start of the course and for the position at the end of the course of the ferromagnetic element, the position of which is to be measured.

FIG. 5 represents, as an example, and for a sensor having a useful course of approximately 6 mm, the induction measured in Gauss (curve with a diamond and left axis) by the magneto-sensitive element 6 as a function of the linear position of the ferromagnetic axis in millimeters and the associated linearity as a percentage (curve with squares and right axis) when a sensor like the one in FIG. 2 is used.

FIG. 6 shows, as an example, and for a sensor having a useful course of 6 mm, the induction measured in Gauss (curve with a diamond and left axis) by the magneto-sensitive element 6 as a function of the linear position of the moveable ferromagnetic element in millimeters and the associated linearity (curve with squares and right axis), measured for several radial positions of the ferromagnetic element when a sensor like the one shown in FIG. 2 is used.

FIG. 7 shows an alternative solution of the sensor wherein the ferromagnetic part 3 surrounds the axially magnetized permanent magnet 5. The magneto-sensitive element is positioned axially in the measuring air gap 9 formed by the first and the second ferromagnetic parts 3 and 4.

FIG. 8 shows an alternative solution of the present sensor. In order to reduce the magnet volume required for the optimum operation of the sensor, the axial length of the permanent magnet 5 can be reduced using a new ferromagnetic part 12, rigidly connected to the first permanent magnet 5. This part has a substantially conical and axisymetric shape is in contact with the permanent magnet. A new stator assembly is thus defined by the parts 3, 4, 5, 6, and 12.

FIG. 9 shows a third alternative solution of the present sensor, wherein a second magnet 11 is introduced into the air gap 9 defined between the ferromagnetic parts 3 and 4. The angular width of this magnet 11 is less than 360° in order to be able to position the juxtaposed magneto-sensitive element 6. Such magnet 11 aims at reducing the offset of the measured signal by the magneto-sensitive element 6 and thus enabling an easier compensation of the effects relative to temperature.

FIG. 10 shows a sectional view of a fourth alternative solution of the sensor. In this alternative solution, the permanent magnet 5 is still a ring magnet, but magnetized radially and not axially like the preceding alternative solutions. In this alternative solution, the magnet 5 is also associated with a third ferromagnetic part 12.

FIG. 11 shows a sectional view of a fifth alternative solution of the sensor wherein the measuring air gap 9, wherein the magneto-sensitive element 6 is inserted, is radial. For reasons of mechanical construction, this fifth alternative solution can be preferred.

FIG. 12 shows a sectional view of the sensor according to a second embodiment. In this second embodiment, the ferromagnetic element 1, the position of which must be measured, has a length substantially equal to the distance between the centres of the two magnets 5 and 11. The magnet 5 is radially magnetized inwards and the magnet 11 is radially magnetized outwards. A first C-shaped ferromagnetic part 3 connects the two permanent magnets 5 and 11 positioned symmetrically relative to the median plane perpendicular to the movement passing through the middle of said part 3. A second T-shaped axisymetric ferromagnetic part 4 is positioned inside the C-shaped part defining an air gap 9 between the ferromagnetic part 3 and the enlargement 10, the air gap 9 wherein the magneto-sensitive element 6 is positioned, which measures the radial component of the magnetic induction. The moveable element 1 moves axially inside the ferromagnetic parts 3 and 4 thus defining 3 air gaps 7, 7' and 8.

It should be noted that the enlargement 10 could be limited to an angular sector opposite the magneto-sensitive element 6 for still increasing the field concentration effect and improving the signal variation, without causing a significant breaking of the symmetry of the magnetic circuit.

FIGS. 13a and 13b show the field lines in the sensor, respectively for the middle and the end positions of the moveable element 1.

FIG. 14 shows, as an example, obtained on a sensor having a useful course of travel of 6 mm, the magnetic induction (curve with squares in Gauss on the left axis) measured by the magneto-sensitive element 6 as well as the associated non-linearity (curve with a diamond in percentage on the right axis) for the sensor of FIG. 12 and a movement of the moveable element 1 between the two end positions, as a function of the position in millimeters.

Figure 1:
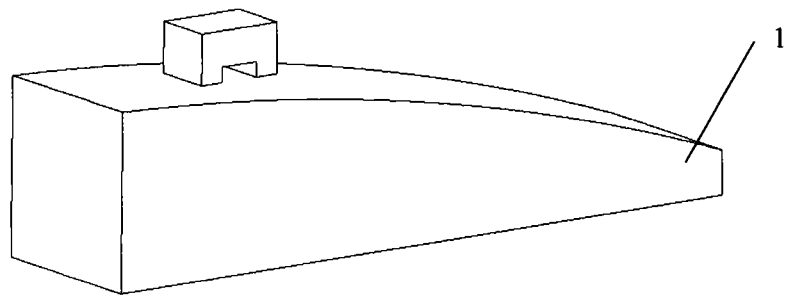
Figure 2:
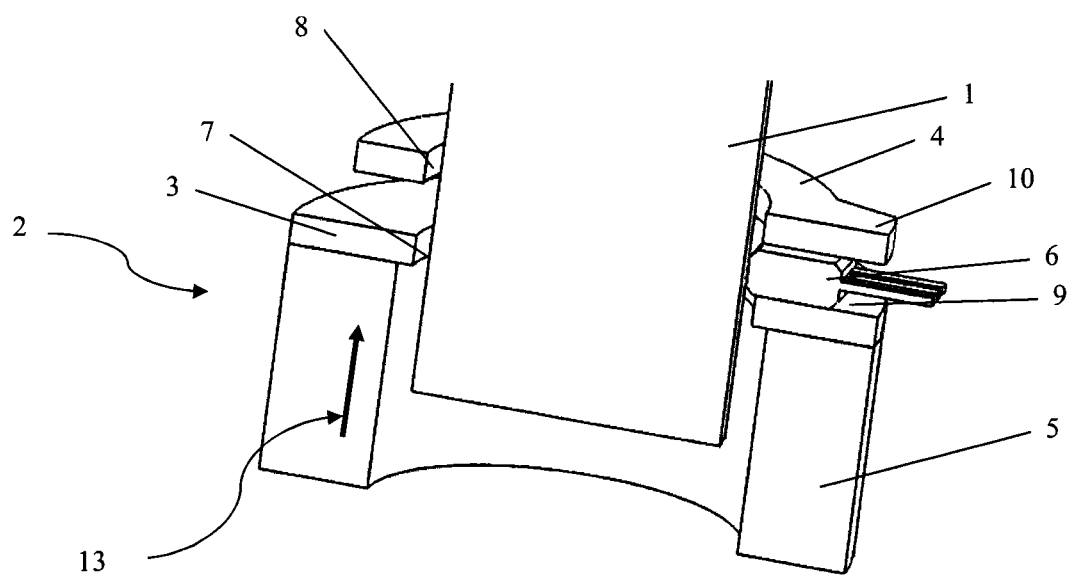
Figure 3:
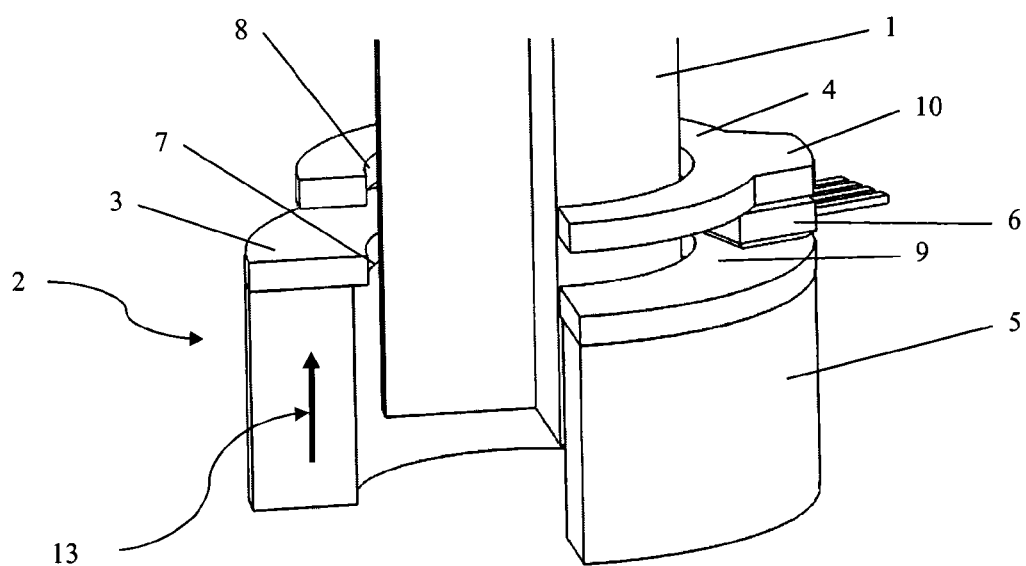
Figure 4A:
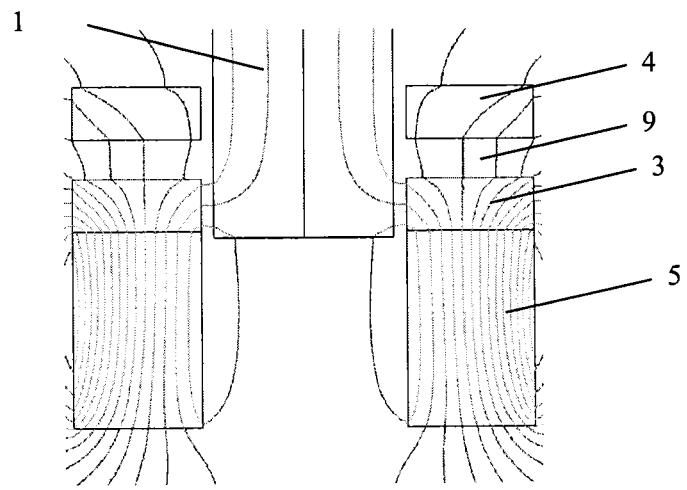
Figure 4B:
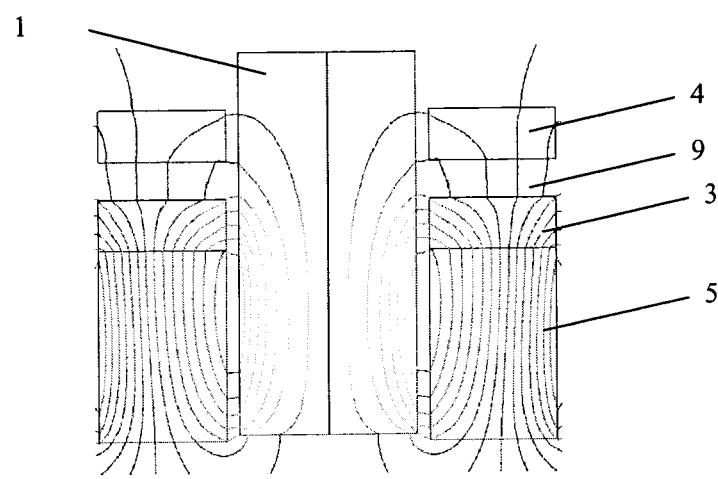
Figure 5:
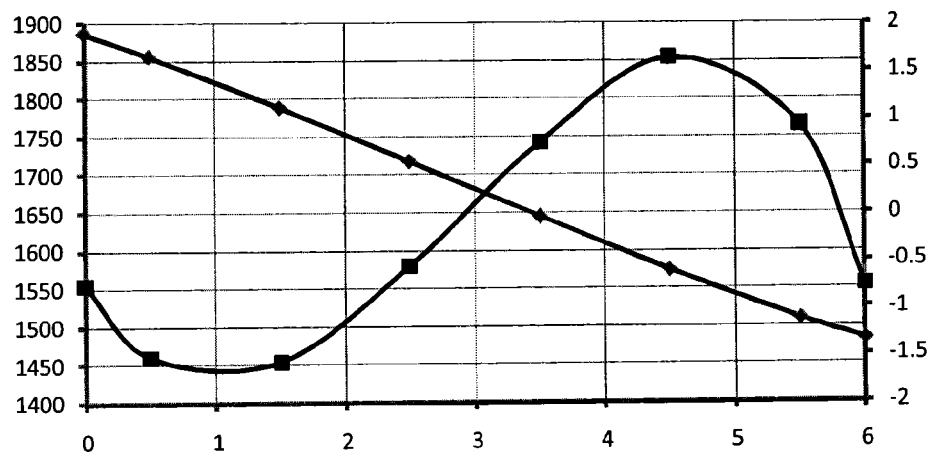
Figure 6:
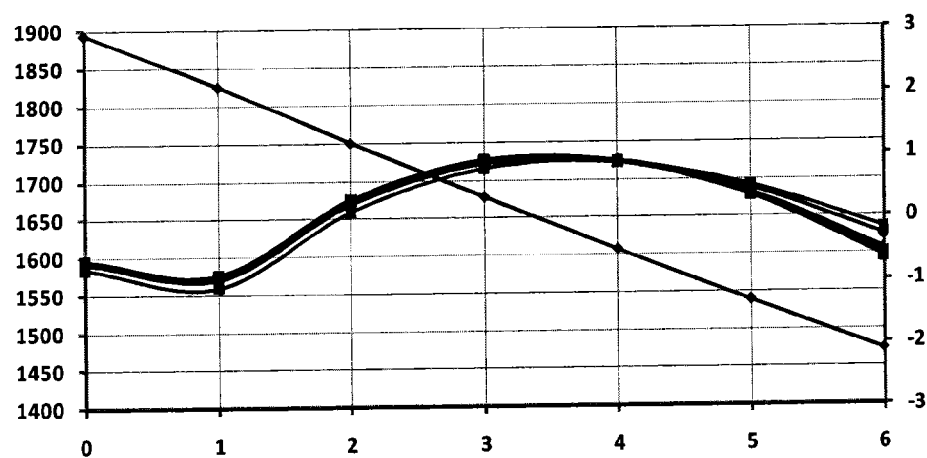
Figure 7:
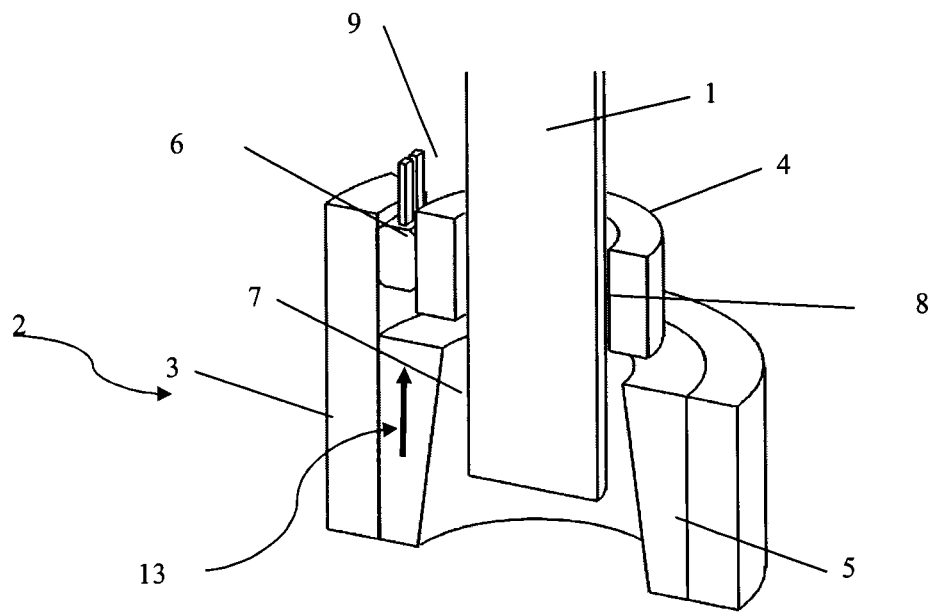
Figure 8:
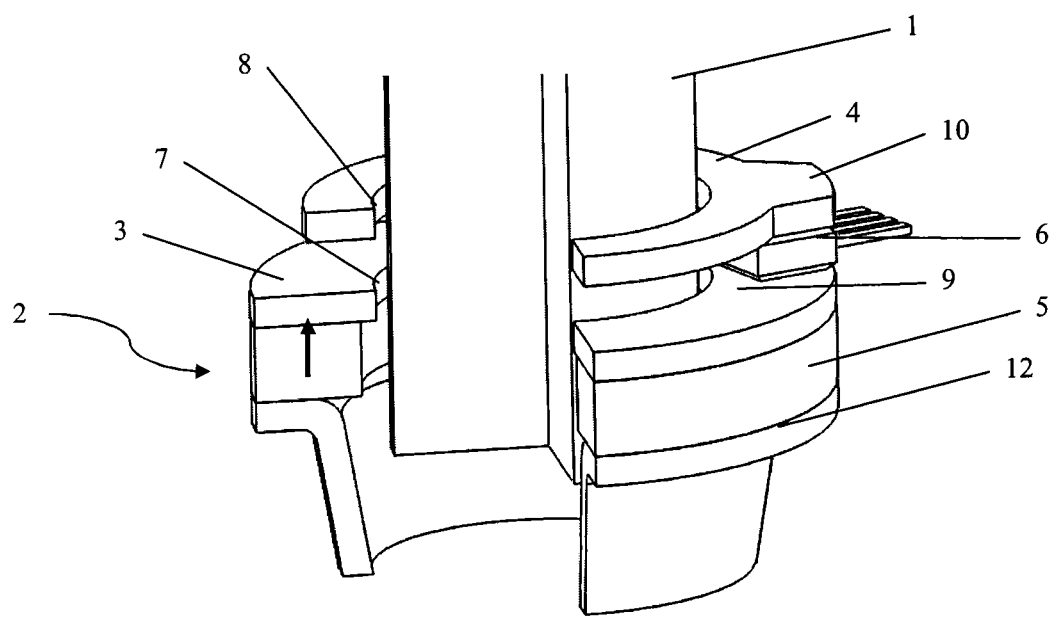
Figure 9:
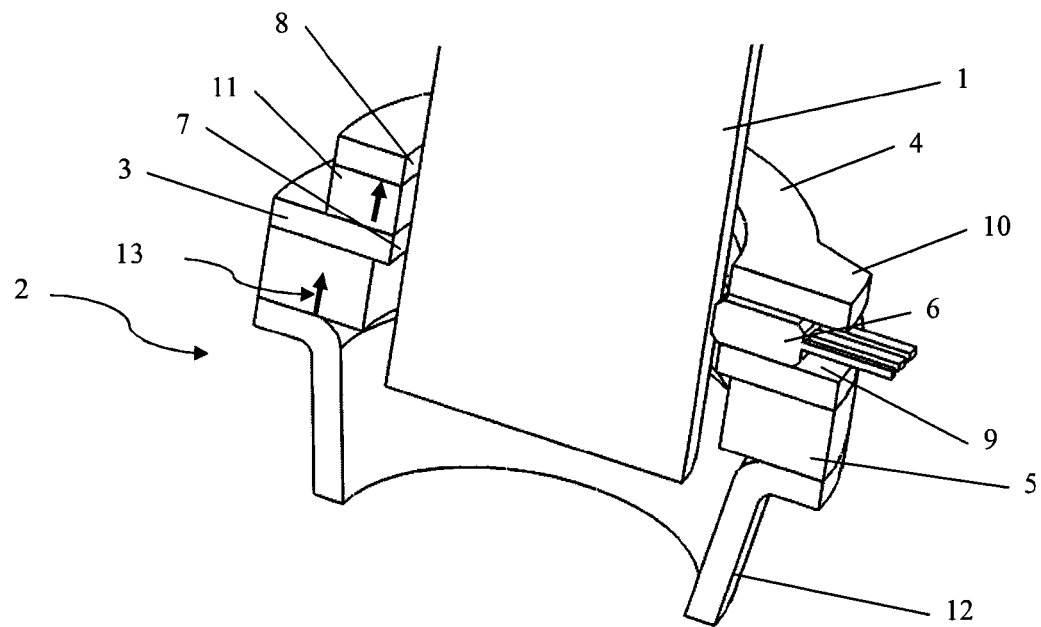
Figure 10:
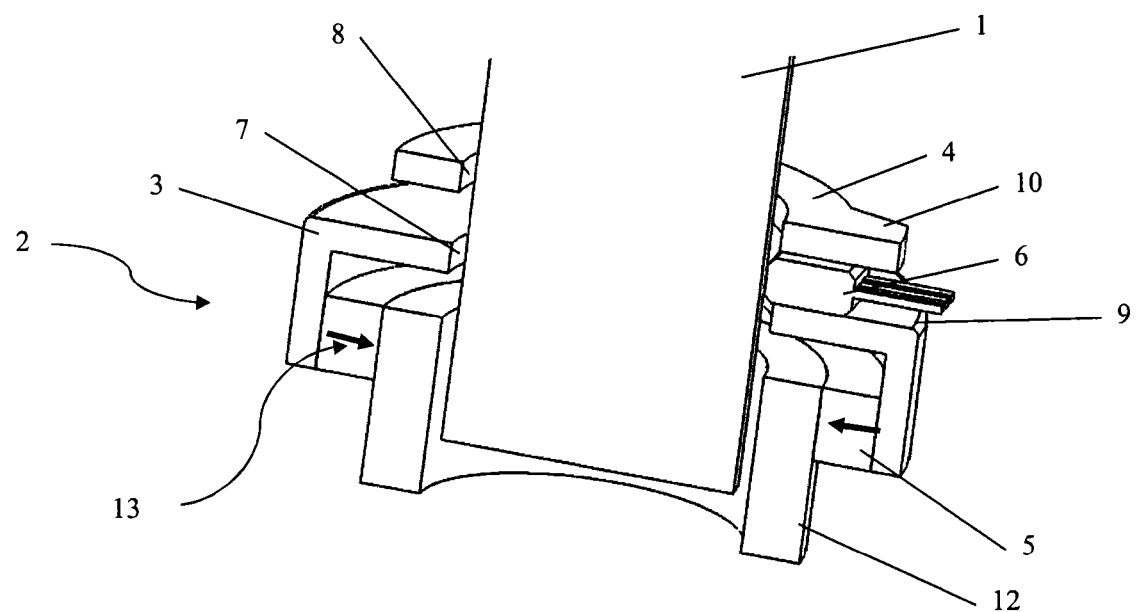
Figure 11:
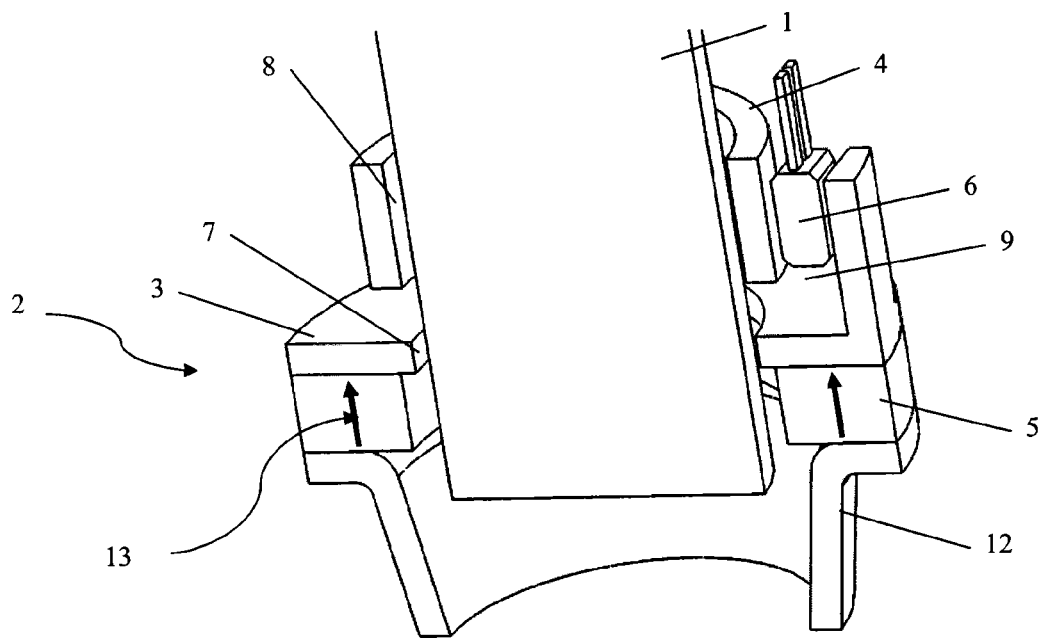
Figure 12:
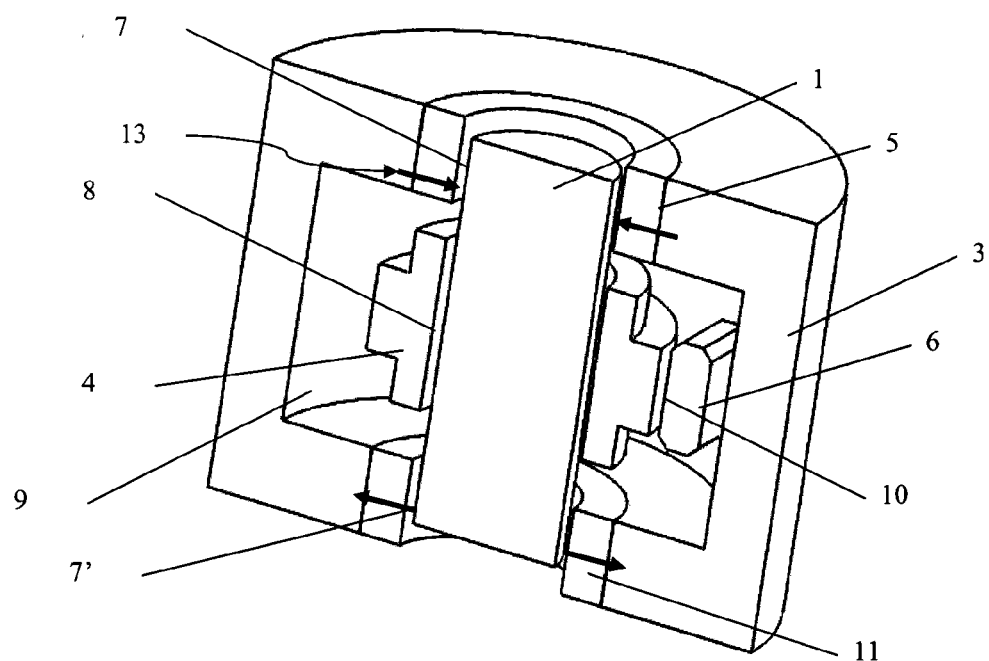
Figure 13A:
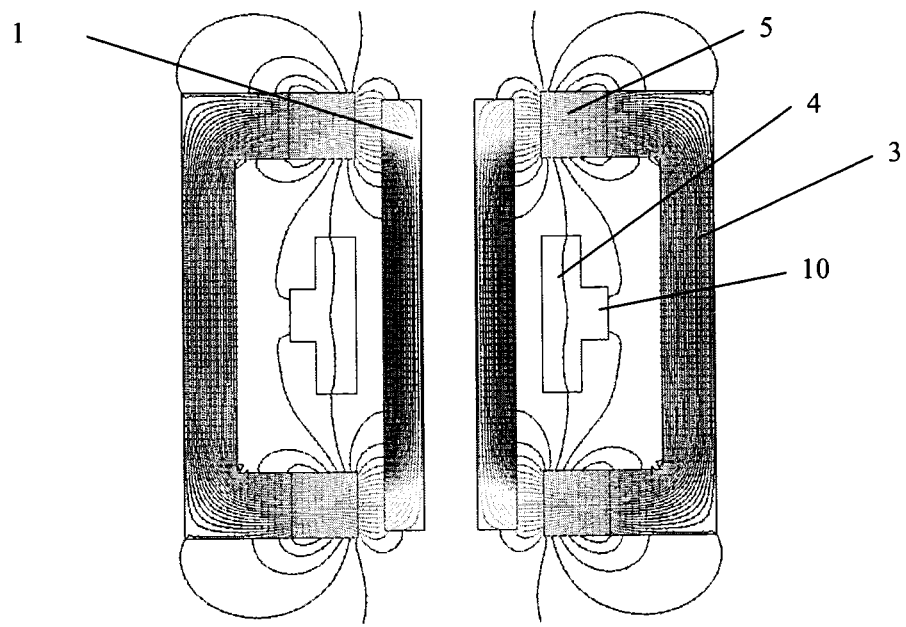
Figure 13B:
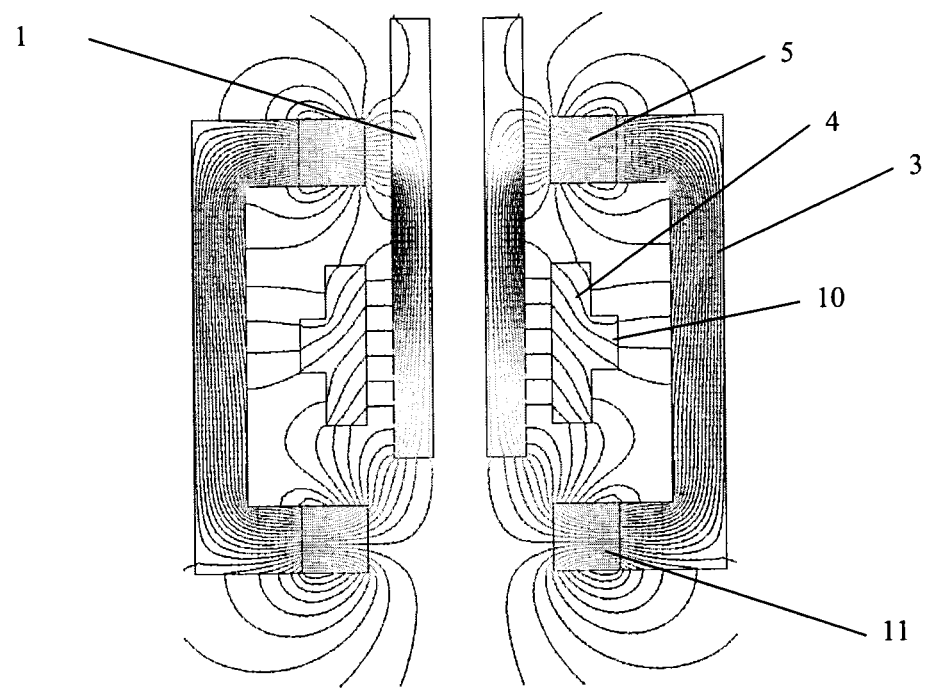
Figure 14:
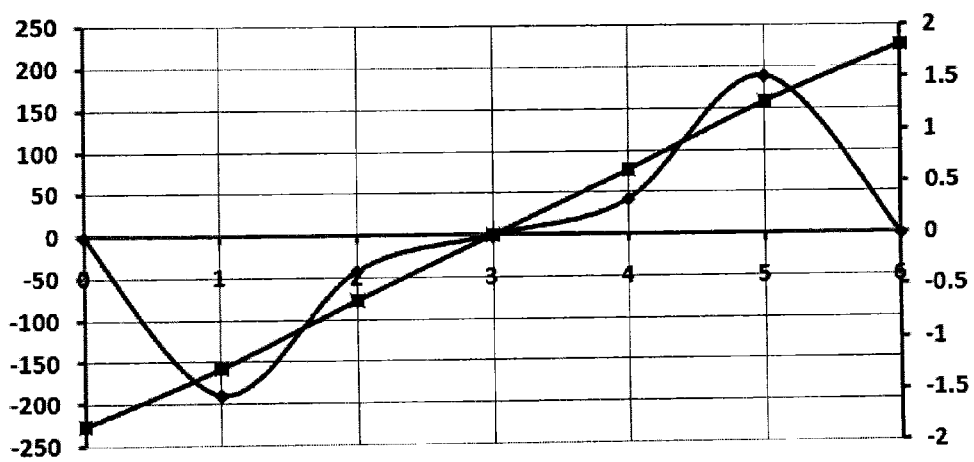
Figure 15:
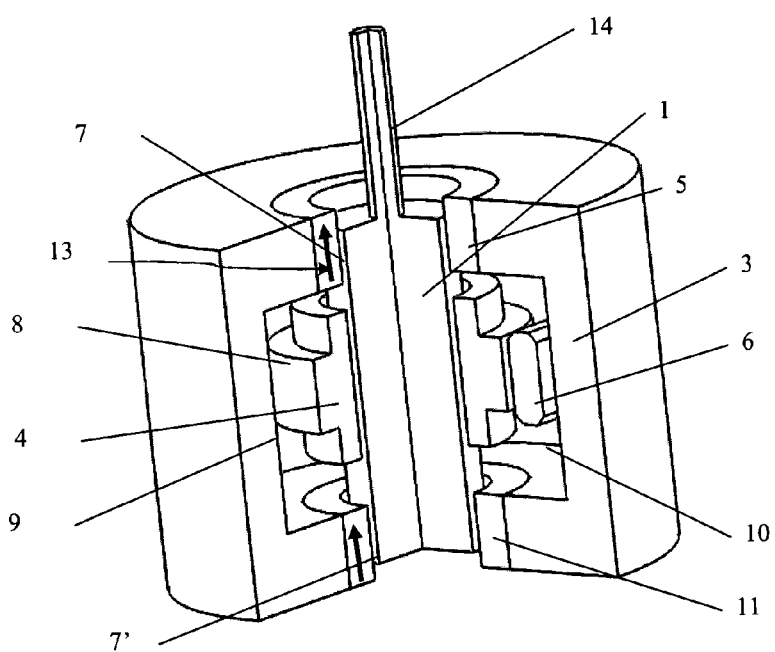
FIG. 15 shows an alternative solution of the structure in FIG. 12, wherein the ferromagnetic axis has a certain length and a narrowed considered section in the plane perpendicular to the movement, on a part of the length thereof, here shown outside the sensor.
Figure 16:
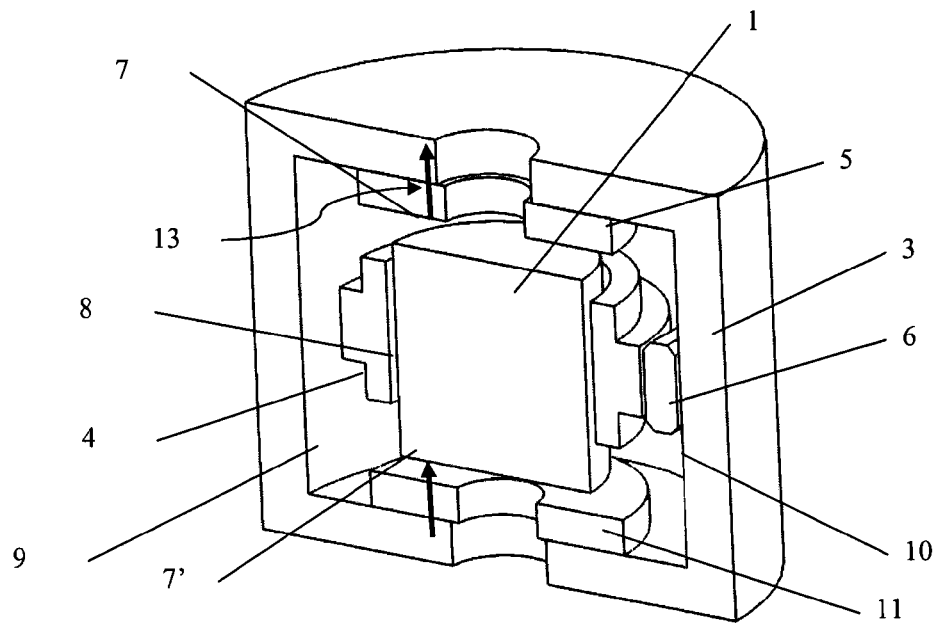
FIG. 16 shows a sectional view of a second alternative solution of the second embodiment. The same components as for the sensor of FIG. 12 can be found, except that, in this second embodiment, the magnets 5 and 11 are axially magnetized.
Figure 17:
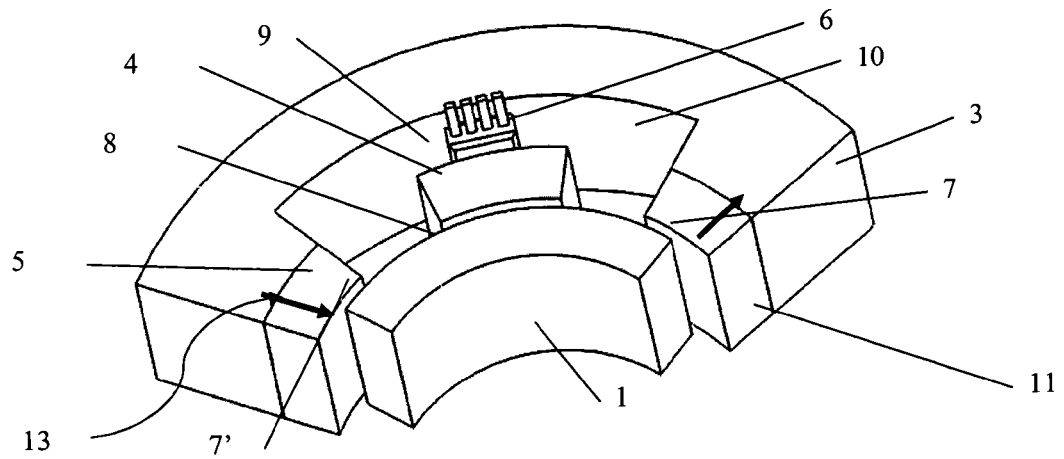
FIG. 17 shows a sensor for detecting an angular position for small courses of travel according to the third embodiment. The same components as for the sensor of FIG. 12 can be found, except that the tile-shaped permanent magnets 5 and 11 are radially magnetized too.

The invention claimed is:

1. A contactless magnetic sensor for detecting a linear or angular position, comprising a stator assembly and a ferromagnetic element moveable relative to the stator assembly and the position of which is detected, with the stator assembly itself comprising at least a first and a second ferromagnetic part, at least a first permanent magnet, and at least a magneto-sensitive element subjected to a magnetic field that depends on the position of the moveable ferromagnetic element and designed to deliver a measurement signal that depends on the magnetic field to which it is subjected, with the first permanent magnet being rigidly connected to the first ferromagnetic part, and the ferromagnetic parts defining with the moveable ferromagnetic element at least a first and a second air gap, characterized in that the first permanent magnet is rigidly connected only to the first ferromagnetic part, in that the two ferromagnetic parts define therebetween at least a third air gap, and in that the magneto-sensitive element is placed in the third air gap.

2. A contactless magnetic sensor according to claim 1, characterized in that the magneto-sensitive element is a Hall-effect probe sensitive to the amplitude of at least one of the components of the magnetic field.

3. A contactless magnetic sensor according to any one of the preceding claims, characterized in that at least one of the two ferromagnetic parts includes an enlargement formed opposite the magneto-sensitive element and enabling a concentration of the magnetic flux.

4. A contactless magnetic sensor according to claim 1, characterized in that the stator assembly includes a second permanent magnet positioned in the third air gap and juxtaposed to the magneto-sensitive element.

5. A contactless magnetic sensor according to claim 1, characterized in that the stator assembly includes a third ferromagnetic part rigidly connected to the first permanent magnet.

6. A contactless magnetic sensor according to claim 1, characterized in that the stator assembly includes the first and a second permanent magnet rigidly connected to the first ferromagnetic part and positioned symmetrically relative to the plane perpendicular to the movement passing through the middle of said first ferromagnetic part.

7. A contactless magnetic sensor according to claim 5, characterized in that the third ferromagnetic part has a substantially conical section.

8. A contactless magnetic sensor according to claim 6, characterized in that at least one of the permanent magnets has a substantially conical section.

9. A contactless magnetic sensor according to claim 1, characterized in that the moveable ferromagnetic element has a length in the direction of the movement thereof and a narrowed considered section in the plane perpendicular to the movement, on a part of the length thereof.

* * * * *